April 16, 1940.　　　　F. A. LARSON　　　　2,197,553
SIGNALING APPARATUS
Filed June 20, 1938
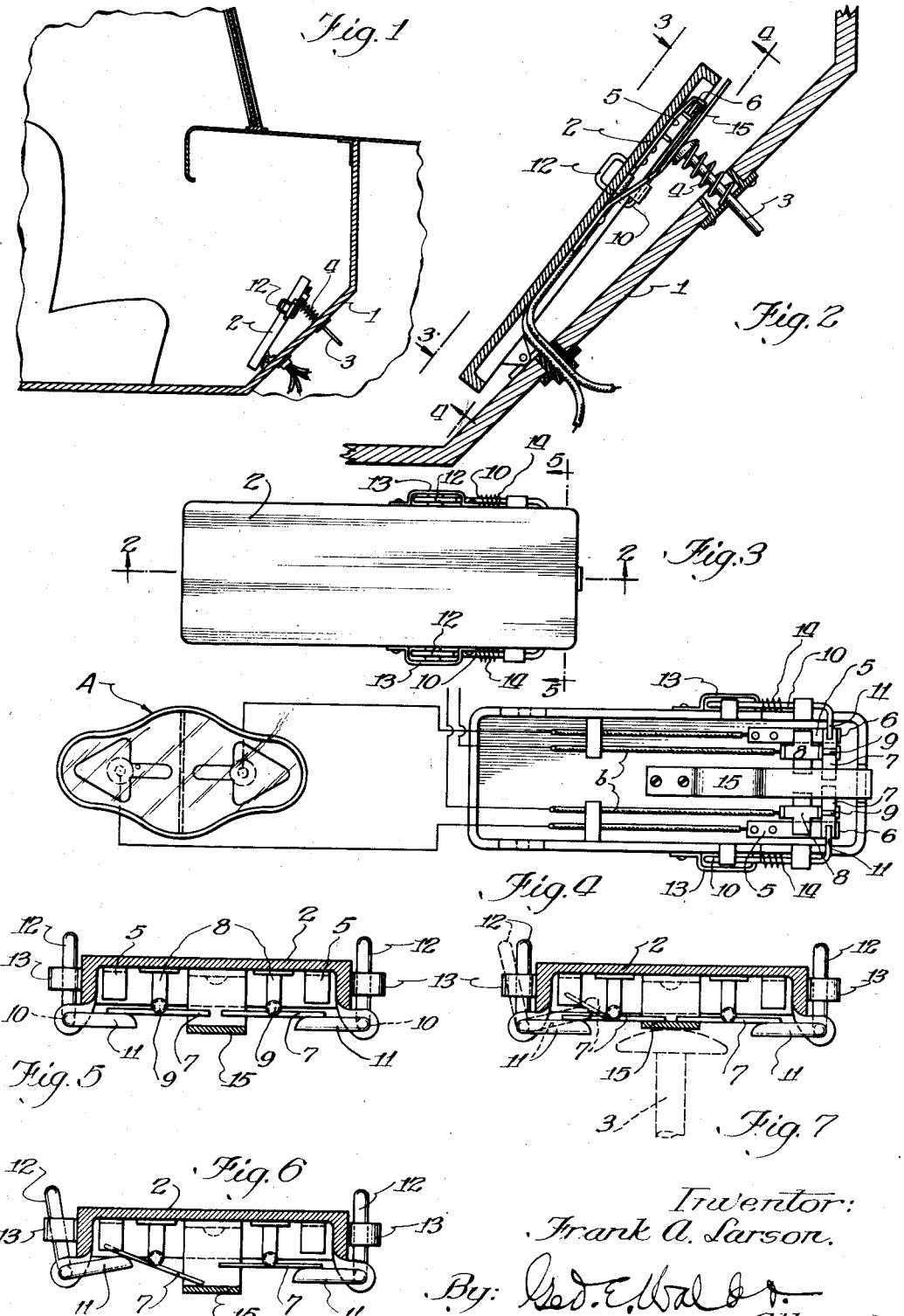
Inventor:
Frank A. Larson.
By: Geo. E. Walb Jr.
Attorney.

Patented Apr. 16, 1940

2,197,553

UNITED STATES PATENT OFFICE 2,197,553

SIGNALING APPARATUS

Frank A. Larson, Chicago, Ill., assignor to Earl J. Baldwin

Application June 20, 1938, Serial No. 214,717

7 Claims. (Cl. 200—59)

This invention relates to signaling apparatus for motor driven vehicles, and relates particularly to such apparatus constructed and arranged for indicating to pedestrians and drivers of other vehicles, contemplated changes in the direction of travel of a vehicle equipped with such apparatus.

A particular object of the invention is to provide signaling apparatus for the purpose specified, which is simple in construction, effective for its designed purpose, and which is designed and adapted to be operated by a foot of the driver to turn the signals on or off, as may be desired, leaving both hands of the driver of said vehicle free for manipulating the steering wheel to guide the vehicle when driving.

A further object of the invention is to provide signaling apparatus for the purpose and of the type specified, which is constructed and arranged for operation when the accelerator pedal is depressed, when driving in heavy traffic and the driver desires to indicate his intention of working over to one side or the other of the road.

The invention also comprises the various other features, combinations of features and details of construction, hereinafter described and claimed.

In the accompanying drawing, in which the invention is fully illustrated:

Fig. 1 is an illustrative, fragmentary, longitudinal, vertical, sectional view of the front end of a typical automobile, equipped with signaling apparatus embodying my invention and improvements, shown in side view;

Fig. 2 is an enlarged, vertical, sectional view of the acelerator pedal, pivoted adjacent one end to the floor of the vehicle, together with signal operating mechanism mounted thereon or in association therewith;

Fig. 3 is a top plan view of said accelerator pedal, and parts of the operating mechanism mounted thereon, or associated therewith;

Fig. 4 is a bottom plan view of said accelerator pedal, and of the signaling and signal operating mechanisms therefor, mounted on said pedal and also indicating, diagrammatically, electric circuits which connect a source of supply of electricity mounted on the vehicle, not shown, with electrically controlled and operated signaling devices mounted on said vehicle and arranged to indicate a change in the direction of travel to pedestrians and occupants of other vehicles;

Fig. 5 is a sectional view of the accelerator pedal on the line 5—5 of Fig. 3, showing the switch members in normal operating positions, in which all signaling devices are turned off;

Fig. 6 is a view substantially similar to Fig. 5, showing a switch member turned into position to energize an electric signal mounted on the vehicle; and Fig. 7 is a view, substantially similar to Fig. 5 with the accelerator pedal depressed and showing a switch operating mechanism mounted on the accelerator pedal actuated to effect contact of a flexible switch member mounted on said pedal, with a relatively fixed switch member, also mounted on said pedal, the relation being such that the flexible switch member will frictionally engage said relatively fixed member.

Describing the invention with reference to the drawing, the numeral 1, Fig. 1, designates the floor of a motor-driven vehicle, pivotally mounted on which is an accelerator pedal 2 and plunger 3, which control the supply of fuel to the carburetor, not shown, in a usual manner, when turned pivotally to depress said plunger against the force of the spring 4 applied thereto.

In accordance with the present invention, my improved direction indicator is electrically controlled by means mounted on the accelerator pedal 2, operating in the following manner;

Secured to the under side of the accelerator pedal 2, one at each side thereof, are relatively fixed switch members 5 made of strips of resilient sheet metal, which is a conductor of electricity, preferably thin strips of alloy steel.

Said switch members, and for the most part, the operating mechanisms associated therewith, are in duplicate on opposite sides of said accelerator pedal, and a description thereof in the singular will therefore, apply equally to both. The free ends of said relatively fixed switch members 5 are bent downwards at slightly obtuse angles to the main portions thereof, as shown at 6, Fig. 2, and mounted in association therewith are switch members 7, also consisting of strips of alloy steel.

Said switch members 7 are rotatably mounted on the pedal 2 in operative relation to the switch members 5 with capacity for turning movement in the following manner, see Fig. 5:

Secured to the underside of the pedal 2 and depending therefrom are brackets 8, secured in the ends of which are pins 9, mounted to turn on which are sleeves to which said switch members 7 are secured, said switch members being maintained in different operating positions by suitable friction devices, not shown, but which can readily be supplied by skilled mechanics.

In accordance with the invention, contact of the switch members 5 and 7, is effected by turning movement of the rotatable members 7 to cause them to frictionally engage the depending ends of the relatively fixed switch members 5, as shown in Fig. 6.

In accordance with the invention, also, engagement of said switch members 7 with the switch members 5 is adapted to be effected by means as follows:

Rotatably mounted on the accelerator pedal 2, one at each side thereof, are rods 10, the front ends of which are bent inwardly beneath said rotatable switch members as shown at 11, and the rear ends of which are turned up preferably in the form of loops, as shown at 12, being so proportioned that they will extend above the top surface of the accelerator pedal 2, a sufficient distance to permit the driver to turn said rods with his foot to effect contact of a rotatable switch member 7 with the relatively fixed switch member 5, as shown in Fig. 6, turning movement of said rod to engage the switch members 7 and 5 being limited by a bracket 13, in which said upwardly extending loops 10 are confined. As shown, also, the turned-up, looped portions, of said rods and parts controlled thereby, are maintained yielding in positions, defined by contact thereof with the sides of the foot pedal 2, by coil springs 14, applied thereto.

After a rod 10 has been actuated to effect engagement of the switch members 7 and 5, they will continue in such engagement until they are separated and reset.

To effect such separation, means are provided as follows:

Secured to the under side of the accelerator pedal 2 is a relatively light, resilient, leaf spring 15, the free end of which is normally spaced from said pedal, and the outer end of which extends beneath the adjacent ends of the resilient switch-members 7, and in such relation thereto that depression of the pedal against the resistance of said leaf spring 15 will first turn or flex said resilient switch-members 7 to disengage them from the relatively fixed switch-members 5, to break the electric circuit and thereby extinguish the signal light, further depression of the pedal operating to depress the accelerator plunger and increase the speed of the vehicle, as will readily be understood.

In accordance with the invention, also when the electric circuit has been opened, in the manner just described, it will remain open until a rod 10 on the pedal is actuated to turn a switch member 7, into engagement with a corresponding relatively fixed member 5, as shown in Fig. 6.

Also, as indicated, diagrammatically, in Fig. 4, of the drawings, the signal lights are electrically operated, the relatively-fixed switch-members 5 being electrically connected with a source of supply of electricity on the vehicle—not shown—by conductors b, thence through a signal lamp mounted in the casing A, arranged to indicate a contemplated change in the direction of travel of the vehicle, and then to ground, as will readily be understood.

I do not, however, desire to limit myself to the particular construction and arrangement herein shown and described, or to any particular construction, but desire to extend the protection of the patent to variations and modifications thereof coming within the scope and contemplation of the appended claims.

With the construction and arrangement of the present application, a signal lamp embodying my invention and improvements, can be operated and maintained indefinitely or extinguished, regardless of whether the vehicle is moving, being accelerated, is stopping or standing still, operation of the entire device being independent of any movement of the accelerator plunger, and does not interfere with any normal function of the accelerator mechanism.

I claim:

1. In combination, a pedal, switch members mounted on the under side and at opposite sides of said pedal and including relatively fixed switch members and resilient switch members arranged to selectively engage said relatively fixed members and automatically returned to inoperative position when released, and means operable by a foot on said pedal, for manipulating the said resilient switch members to effect contact thereof with said relatively fixed switch members.

2. The combination specified in claim 1 in which the foot-operated means consists of rods mounted to turn in bearings on the pedal, the ends of said rods being turned inwardly beneath the proximate ends of the resilient switch members, and in such relation that the turning movement of said rods will effect engagement of their turned-in ends with, and actuation of, said resilient switch members.

3. The combination specified in claim 1 in which the foot-operated means consists of struck-up portions, which extend sufficiently above the top side of the pedal to provide for contemplated turning of said members by a foot resting on the pedal, said turning being limited by brackets in which said struck-up portions are confined.

4. The combination specified in claim 1 in which the foot-operated means consists of rotatable members mounted on the pedal, and maintained yieldingly in position, defined by contact thereof with the lateral sides of said pedal by coil springs applied thereto.

5. In combination, a depressible plunger; a depressible pedal positioned over said plunger for depressing the same; resilient switch members pivotally mounted on the under side of said pedal and arranged to be swung or flexed by the reaction of said plunger when said pedal is depressed; relatively fixed switch members on said pedal arranged to be engaged by said pivoted switch members when swung by depression of said pedal; and means operable by a foot on said pedal for selectively flexing said resilient switch members into engagement with said fixed switch members.

6. The combination specified in claim 5, which also comprises a leaf spring positioned on the under side of said pedal between said plunger and said resilient switch members and arranged to cause swinging or flexing of said resilient switch members upon depression of said pedal.

7. In combination, a pedal, two relatively fixed switch members on said pedal, two independently resilient switch members pivotally mounted on said pedal, each arranged to be flexed or swung separately into engagement with one of said fixed members, and means operable by a foot on said pedal for manipulating either of said resilient switch members to effect contact thereof with its associated fixed switch member.

FRANK A. LARSON.